(12) United States Patent
Gosink et al.

(10) Patent No.: US 9,569,732 B2
(45) Date of Patent: Feb. 14, 2017

(54) SYSTEM AND METHOD OF DESIGNING MODELS IN A FEEDBACK LOOP

(71) Applicants: Luke C. Gosink, Richland, WA (US); Trenton C. Pulsipher, West Richland, WA (US); Landon H. Sego, Richland, WA (US)

(72) Inventors: Luke C. Gosink, Richland, WA (US); Trenton C. Pulsipher, West Richland, WA (US); Landon H. Sego, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 369 days.

(21) Appl. No.: 13/869,290

(22) Filed: Apr. 24, 2013

(65) Prior Publication Data

US 2013/0297538 A1 Nov. 7, 2013

Related U.S. Application Data

(60) Provisional application No. 61/640,938, filed on May 1, 2012.

(51) Int. Cl.
*G06N 3/00* (2006.01)
*G06N 99/00* (2010.01)
*G06N 3/12* (2006.01)
*G06N 7/00* (2006.01)
*G06F 17/50* (2006.01)

(52) U.S. Cl.
CPC ......... *G06N 99/005* (2013.01); *G06F 17/5009* (2013.01); *G06N 3/126* (2013.01); *G06N 7/005* (2013.01); *G06F 2217/10* (2013.01); *G06F 2217/16* (2013.01)

(58) Field of Classification Search
None
See application file for complete search history.

(56) References Cited

U.S. PATENT DOCUMENTS

| 8,160,995 | B1 * | 4/2012 | Crawford et al. | 706/62 |
| 8,725,666 | B2 * | 5/2014 | Lemmond et al. | 706/13 |
| 2007/0288414 | A1 | 12/2007 | Barajas et al. | |
| 2011/0213742 | A1 * | 9/2011 | Lemmond et al. | 706/13 |
| 2011/0307422 | A1 * | 12/2011 | Drucker et al. | 706/12 |

OTHER PUBLICATIONS

Raftery, A. E., et al., Using Bayesian Model Averaging to Calibrate Forecast Ensembles, Monthly Weather Review, 133, 5, 2005, 1155-1174.
Vrugt, J. A., et al., Multi-objective calibratio of forecast ensembles using Bayesian model averaging, Geophysical Research Letters, vol. 33, L19817, doi10.1029/2006GL027126, 2006, 1-6.

(Continued)

*Primary Examiner* — Kakali Chaki
*Assistant Examiner* — Mai T Tran

(57) ABSTRACT

A method and system for designing models is disclosed. The method includes selecting a plurality of models for modeling a common event of interest. The method further includes aggregating the results of the models and analyzing each model compared to the aggregate result to obtain comparative information. The method also includes providing the information back to the plurality of models to design more accurate models through a feedback loop.

15 Claims, 2 Drawing Sheets

(56) References Cited

OTHER PUBLICATIONS

Apostolakis, G., The concept of Probability in Safety Assessments of Technological Systems, Science, 250, (4986), 1990, 1359-1364.
Breiman, L, Bagging Predictors, Machine Learning, 24, 1996, 123-140.
Devooght, J., Model uncertainty and model inaccuracy, Reliability Engineering and System Safety, 59, 1998, 171-185.
Freund, Y., et al., Experiments with a New Boosting Algorithm, Machine Learning: Proceedings of the Thirteenth International Conference, 1996, 148-156.
Morales-Casique, E., et al., Maximum likelihood Bayesian averaging of airflow models in unsaturated fractured tuff using Occam and variance windows, Stoch Enviton Res Risk Assess, 24, 2010, 863-880.
Opitz, D., et al., Popular Ensemble Methods: An Empirical Study, Journal of Artificial Intelligence Research, 11, 1999, 169-198.
Rojas, R., et al., Assessment of conceptual model uncertainty for the regional aquifer Pampa del Tamarugal—North Chile, Hydrol Earth Syst Sci, 14, 2010, 171-192.
Rokach, L, Ensemble-based classifiers, Artificial Intelligence Review, 33, 2010, 1-39.
Hoeting, J. A., et al., Bayesian Model Averaging: A Tutorial, Statistical Science, 14, 4, 1999, 382-417.
Webb, G. K., et al., Not So Naive Bayes: Aggregating One-Dependence Estimators, Machine Learning, 58, 2005, 5-24.
International Search Report/Written Opinion for International Application No. PCT/US2013/038118, International Filing Date, Apr. 25, 2013, Date of Mailing Apr. 25, 2014.

\* cited by examiner

SYSTEM AND METHOD OF DESIGNING MODELS IN A FEEDBACK LOOP

CROSS-REFERENCE TO RELATED APPLICATIONS

This application claims priority to U.S. Provisional Application Ser. No. 61/640,938, filed May 1, 2012, titled "SYSTEM AND METHOD OF DESIGNING MODELS IN A FEEDBACK LOOP," hereby incorporated by reference in its entirety for all of its teachings.

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to model design. More specifically, this invention relates to methods and systems that statistically analyze multiple model outputs using Bayesian analysis and then provide the outputted information back to the models via a feedback loop.

BACKGROUND OF THE INVENTION

Across scientific disciplines, most domains are affected by the uncertainty associated with model conceptualization. Technically referred to as model selection uncertainty, this uncertainty is associated with correctly selecting a set of domain-specific interpretations, processes, and mathematical systems in order to accurately model behavior or classify events of interest (e.g. protein structures, weather systems, image recognition tasks, etc.). This type of uncertainty is the greatest source of error and risk associated with modeling and forecasting.

One of the most powerful ways to address model selection uncertainty is through the aggregate prediction of a model ensemble. These ensembles are composed of individual models (here models can be an algorithm, a mathematical model, and expert opinion, etc.) where each model uniquely explores a portion of hypothesis space by uniquely defining a set of processes, systems, and relationships that can describe the event of interest. The aggregate obtained from a model ensemble—through techniques such as bootstrap aggregating, boosting, and Bayesian Model Averaging—provides better overall predictive performance and exhibits less bias than any of the ensemble's individual constituents because the aggregate is derived from a weighted combination of all of the ensemble members.

While aggregates provide more accurate estimates for prediction and forecasting, these aggregates do not help modelers refine and improve the individual models that initially formed the ensemble. There is no known method that utilizes the benefits of aggregation techniques to provide feedback to modelers so that they can better understand the events they are trying to model, characterize, or classify.

SUMMARY OF THE INVENTION

The present invention is directed to a method of designing models in a feedback loop. In one embodiment, the method comprises selecting a plurality of models for modeling a common event of interest; aggregating the results of the models; analyzing each model compared to the aggregate result to obtain reliable or comparative information; and providing the information back to the plurality of models to design more accurate models through the feedback loop.

In one embodiment, the aggregating the results of the models comprises inputting the results of the models and measurement data to create an aggregate result using Bayesian model aggregation (BMA).

The event of interest includes, but is not limited to, the following: $CO_2$ plumes, power system dynamics, protein structures, weather systems, image recognition tasks, and nuclear safety.

In one embodiment, the models are conceptual models. The models can be statistical models.

In one embodiment, the analyzing each model compared to the aggregate result comprises comparing differences between the BMA and each model and/or analyzing how the BMA utilizes each model in the aggregate based on information criteria. Comparing the differences between the BMA and each model may further comprise using a variety of statistical methods including, but not limited to, analysis of variance to select certain models. Also, analyzing how the BMA utilizes each model in the aggregate based on information criteria may also comprise using a variety of statistical methods including, but not limited to, analysis of variance to select certain models.

In one embodiment, models that are fundamental to the aggregate—e.g., based on analysis of variance and information criteria—are identified and held constant. Information criteria includes statistical measurements of how much information a statistical model has.

In one embodiment, the information regarding the differences in estimates and the information criteria of each model are fed back to the plurality of models.

In another embodiment of the present invention, a system for designing models is disclosed. The system comprises a plurality of models predicting or estimating an event of interest; a workstation for aggregating the results; means for analyzing each model compared to the aggregate result to obtain reliable or comparative information; and a feedback loop to provide the information back to the plurality of models to design more accurate models.

In one embodiment, the workstation for aggregating comprises Bayesian model aggregation (BMA) software that takes as inputs the results of the models and measurement data to create an aggregate result.

The system can comprise a variety of statistical methods including, but not limited to, analysis of variance software to select certain models. The selected models that have estimates that closely match the BMA, ±5% BMA estimate, are identified and held constant. This information regarding the differences in estimates and the information criteria of each model is fed back to the plurality of models via the software feedback loop.

In another embodiment of the present invention, a method of designing models in a feedback loop is disclosed. The method comprises selecting a plurality of models for modeling a common event of interest and aggregating the results of the models by inputting the results of the models and measurement data to create an aggregate using a Bayesian Model Aggregation (BMA). Measurement data includes a series of measurements taken from instruments, such as sensors and satellites, that measure the event of interest. The method further comprises analyzing each model compared to the aggregate result to obtain reliable or comparative information. The analyzing further comprises comparing differences between the BMA and each model and/or analyzing how the BMA utilizes each model in the aggregate based on information criteria. The method also comprises providing the information back to the plurality of models to design more accurate models through the feedback loop. Information regarding the differences and the information criteria are fed back to the plurality of models.

In another embodiment of the present invention, a method of designing models is disclosed. The method includes selecting a plurality of models for modeling a net interchange schedule (NIS) for a power system. The method further includes aggregating the results of the NIS models into an aggregate forecast. The method also includes analyzing each NIS model compared to the aggregate result to obtain comparative information. Comparative information is a comparison of each model to the aggregate. The method also includes providing the information back to the plurality of NIS models to design more accurate models through the feedback loop.

DETAILED DESCRIPTION OF THE PREFERRED EMBODIMENTS

The present invention is directed to methods and systems for designing models in a feedback loop.

The present invention describes, in one embodiment, a diagnostic model design system driven by a combination of statistical aggregation methods, ensemble analysis techniques, and model specification strategies. The system takes as input a collection of disparate information and/or models (e.g., predictive machinery, numerical models, conceptual models, and/or expert opinions) where the information and models are attempting to model or estimate a common process, event, or outcome. Optionally, the system can also take real-world observation data. Through the system, strengths and weaknesses of information and models can be identified; information sources and models can be ranked by reliability and performance; and, a basis for designing and validating new, more reliable and accurate information sources and models is provided.

In one embodiment, the invention combines Bayesian methods for aggregating disparate information sources with statistical methods for analyzing the aggregate construction process itself. This second layer of analysis may consist of clustering analysis, likelihood assessment, and other methods to identify and quantify the specific benefits obtained through the aggregation process. This analysis identifies the why, where, and how certain combinations of information are better than others. Also, the system links valid portions of information streams and models that were identified through the aggregation to the design assumptions and choices behind the information streams and models. The information provided through this linkage supports a feedback loop that helps designers and modelers build new, more accurate designs for models (e.g., for detection, classification, predictive modeling, etc.). One embodiment of this feedback loop is illustrated in FIG. 1.

Figure 1:
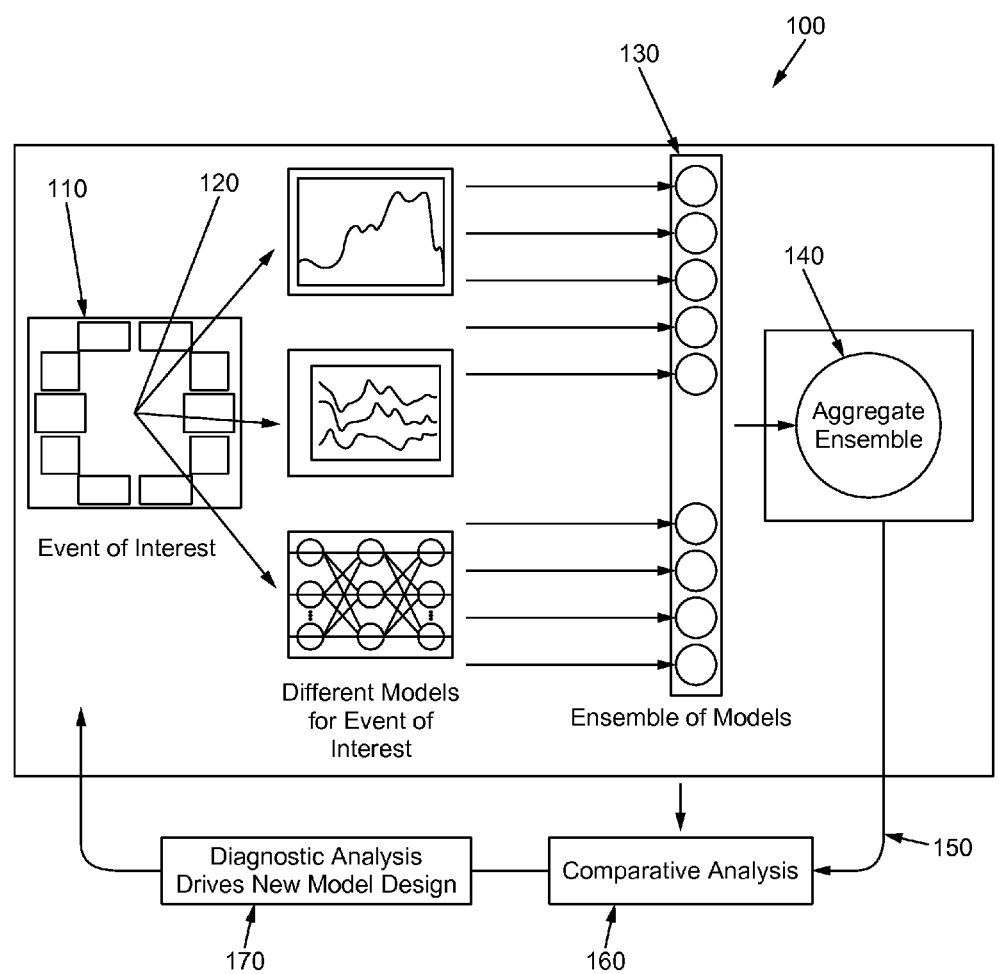
FIG. 1 is a work-flow depicting an information feedback loop driving model design from an ensemble aggregate, in accordance with one embodiment of the present invention.

FIG. 1 shows a system 100 work-flow depicting an information feedback loop driving model design, in accordance with one embodiment of the present invention. The system 100 includes at least one event of interest 110. Sensors (not shown) typically capture ground truth data for each event of interest 110 which is used to design a plurality of models 120 for predicting or estimating the event of interest 110. The output or ensemble 130 of models provides predictions for the ground truth data. An aggregate ensemble 140 aggregates the results from the ensemble of models 130. An integrated analysis 160 is performed that compares the aggregate 140 to each individual model of the plurality of models. A diagnostic analysis 170 provides evidence to help understand which models are more relevant or important. This information is used to refine designs of the models using a feedback loop 150.

Figure 2:
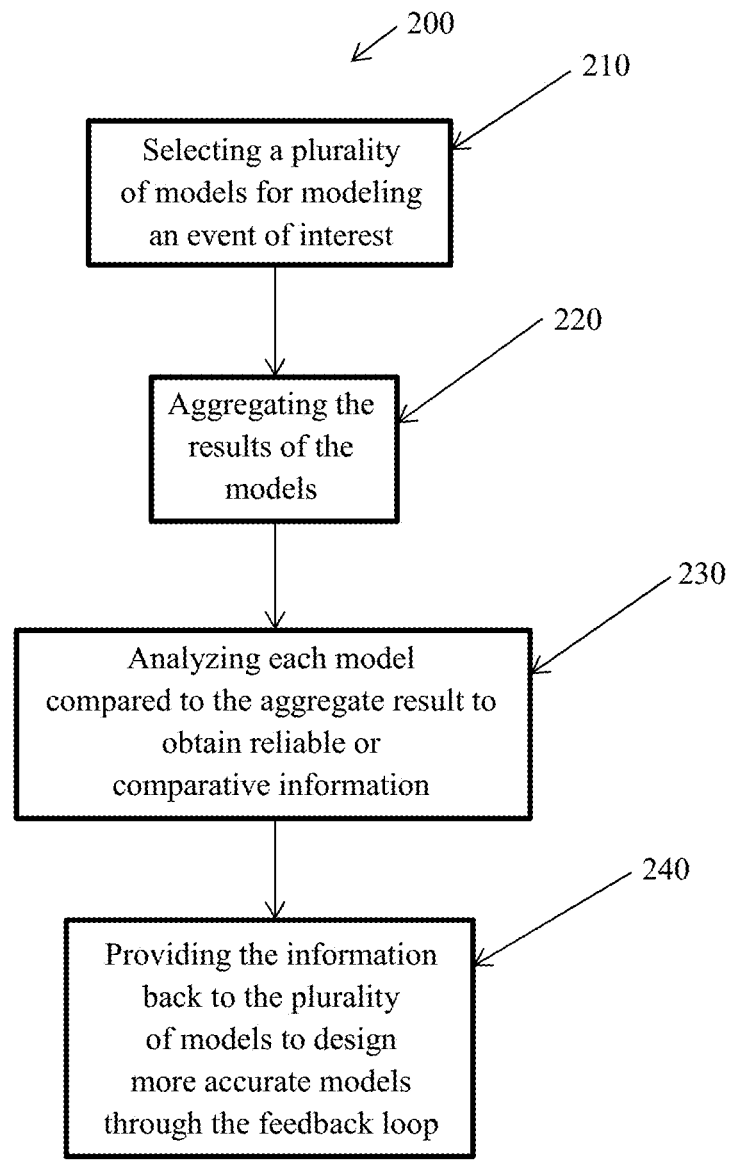
FIG. 2 is a flow chart of a method of designing models in a feedback loop, in accordance with one embodiment of the present invention.

FIG. 2 is a flowchart 200 of a method of designing models in a feedback loop, in accordance with one embodiment of the present invention. In 210, a plurality of models for modeling an event of interest is selected. In 220, the results of the models are aggregated. In 230, each model analyzed is compared to the aggregate result to obtain reliable or comparative information. In 240, the information is provided back to the plurality of models through the feedback loop to design more accurate models.

Experimental Section

The following examples serve to illustrate certain embodiments and aspects of the present invention and not to be construed as limiting the scope thereof.

Experiment

In the following experiments, the common event of interest was the net interchange schedule (NIS) for a power system. The modeling of a NIS is an example of modeling power system dynamics. To improve the efficiency and reliability of power grid operations, neighboring system operators often exchange electric power with each other. NIS is the sum of the transactions between these operators and their neighbors. NIS is used in security constrained economic dispatch to calculate the economic dispatch of next several hours. Therefore, effective modeling of the submitted NIS can improve operation efficiency of a system operator. The goal of this NIS experiment was to design better models that more accurately predict the NIS of next several hours.

Approximately 280 different variables or components are used for forecasting NIS. 10 different models, each comprising 10 different variables of the approximately 280 total variables, were created for the experiments. No model included the same variables of the other 9 models. Each model was used to make a prediction of the NIS for each next hour. The BMA combined the forecasts of all the models into an aggregated forecast, which was denoted as BMA1. Each of the 10 models was analyzed compared to the aggregated results to obtain reliable or comparative information.

To validate the system and method of designing models using a feedback loop, a 100× cross validation study was performed. In other words, the experiment was conducted 100 times so as to independently examine over 100 distinct ensemble systems, where each experiment represented a distinct experiment. The ensembles are defined by the unique models—10 in this case—that attempt to predict power demands on the power grid in the next several hours.

The system of the present invention was applied to each experiment to design a better new model 11, which was used to create a new BMA, BMA2. The modeling results were compared to actual ground truth data.

Results

In 80/100 (80%) experiments, the new model 11 was better than any of the original ensemble members—models 1-10. In 88/100 (88%) experiments, the new model 11 was either the best or second best model compared to models 1-10. In 91/100 (91%) experiments, the new model 11 was the first, second or third best model compared to models 1-10. In 95/100 (95%) experiments, BMA2 was a more accurate ensemble—since it included more accurate or updated models 1-10 due to the influence of model 11—than BMA1.

As mentioned above, the system and method of the present invention is not limited to any particular event of interest. The present invention can be applied to design better models in other areas such as, but not limited to, $CO_2$ plumes, protein structures, weather systems, image recognition tasks, and nuclear safety.

In designing models for any of these events of interest, the following steps may apply. Initial models are created and ground truth data is provided to compare with the modeled results. An aggregate or BMA, using an ensemble method, is created. The results of each individual model is compared to the aggregate, providing evidence that certain models may be more or less relevant to the ground truth. This may include analyzing the similarities and differences between the BMA and each individual model. The information obtained from this construction process is used to refine designs of the relevant models into a new model—model 11 in the example above. This refined or new model may be added to the ensemble, and the iterative design process continued.

The results of the model can be aggregated using a workstation that is running an HRIPE and a HDFS database. The feedback loop can be automated to directly leverage the results of aggregation to design a new model. Optionally, the feedback loop can present aggregation results visually via charts and plots so that subject matter experts can leverage the results to help design the next set of models.

The workstation may be at least one of the following: a computer, a laptop computer, a handheld computer, a desktop computer, a workstation, a data terminal, a server, a mobile communication device, or any combination thereof.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, the system or data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback;

and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The system of the present invention is distinct from previous works in several ways. For example, the system of the present invention can indicate not only which information sources are better, but it can identify where and how these sources are better (e.g., spatiotemporally) than others.

Also, the system uses the aggregate analysis to help modelers and/or designers form new designs and models via the information feedback loop so that the valid assumptions from more reliable, accurate information sources and models are captured and tightly integrated in new designs. Through this iterative process, modelers will better understand their subject of interest and new models will become increasingly more accurate and reliable.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method of designing models comprising:
   a. selecting a plurality of predictive models to model a common event of interest;
   b. modeling the common event in each of the predictive models;
   c. aggregating results from said modeling by inputting the results from said modeling and measurement data to create an aggregate result using Bayesian model aggregation (BMA);
   d. comparing the results from each modeling activity to the aggregate result to obtain comparative information;
   e. providing the comparative information back to the plurality of predictive models through a feedback loop; and
   f. modifying at least one of the plurality of predictive models based upon information received from said feedback loop to refine the predictive models.

2. The method of claim 1 wherein the event of interest includes one of the following: $CO_2$ plumes, power system dynamics, protein structures, weather systems, image recognition tasks, and nuclear safety.

3. The method of claim 1 wherein the predictive models are conceptual models.

4. The method of claim 1 wherein the predictive models are statistical models.

5. The method of claim 1 wherein the step of comparing each modeling activity result to the aggregate result comprises at least one of the following: 1) comparing estimate differences between the BMA and each predictive model and 2) analyzing how the BMA utilizes each predictive model in the aggregate based on information criteria.

6. The method of claim 5 wherein each of the steps of comparing the differences between the BMA and each predictive model and the analyzing how the BMA utilizes each predictive model further comprises using a statistical method to select certain models.

7. The method of claim 6 wherein the statistical method is an analysis of variance statistical method.

8. The method of claim 6 wherein information regarding the differences in estimates and the information criteria of each predictive model are fed back to the plurality of models.

9. The method of claim 5 wherein the predictive models which are based on at least one of analysis of variance and the information criteria are identified and held constant.

10. A system for designing predictive models comprising:
    a. a plurality of predictive models for predicting or estimating an event of interest;
    b. a workstation containing:
    a processor that performs modeling based upon the predictive models and aggregates results from the modeling using Bayesian model aggregation (BMA) software that takes as inputs the results of the predictive models and measurement data to create an aggregate result;
    the processor that performs analyzing each of the plurality of predictive models compared to the aggregate result to obtain comparative information; and
    a feedback loop that provides the comparative information back to the processor to create a new or refined model;
    wherein the workstation is selected from the group consisting of a computer, a laptop computer, a handheld computer, a desktop computer, a data terminal, a server, a mobile communication device, and any combination thereof.

11. The system of claim 10 wherein the event of interest is selected from the group consisting: $CO_2$ plumes, power system dynamics, protein structures, weather systems, image recognition tasks, and nuclear safety.

12. The system of claim 10 wherein the predictive models are conceptual models.

13. The system of claim 10 wherein the predictive models are statistical models.

14. A method of designing models comprising:
    a. selecting a plurality of predictive models for modeling a net interchange schedule (NIS) for a power system;
    b. modeling the net interchange schedule (NIS) for a power system in each of the predictive models;
    c. aggregating results of the NIS modeling into an aggregate forecast model by inputting the results of the NIS modeling and measurement data to create an aggregate result using Bayesian model aggregation (BMA);
    d. comparing each NIS model to the aggregate forecast model to obtain comparative information; and
    e. providing the comparative information back to the plurality of NIS models through a feedback loop; and
    f. modifying at least one of the NIS models based upon information received from the feedback loop.

15. A method of designing models comprising:
a. selecting a plurality of predictive models for modeling a common event of interest;
b. modeling the common event in each of the predictive models;
c. aggregating results of the modeling by inputting the results of the predictive models and measurement data to create an aggregate using Bayesian model aggregation (BMA);
d. analyzing each predictive model compared to the aggregate to obtain comparative information, wherein the analyzing comprises at least one of the following: comparing differences between the BMA and each predictive model and analyzing how the BMA utilizes each predictive model in the aggregate based on information criteria; and
e. providing the comparative information back to the plurality of predictive models through a feedback loop; and
f. refining the designs of the models into a new or refined model.

\* \* \* \* \*